United States Patent
Rees et al.

(10) Patent No.: US 6,965,860 B1
(45) Date of Patent: Nov. 15, 2005

(54) SPEECH PROCESSING APPARATUS AND METHOD MEASURING SIGNAL TO NOISE RATIO AND SCALING SPEECH AND NOISE

(75) Inventors: David Llewellyn Rees, Guilford (GB); Robert Alexander Keiller, Guilford (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/551,909

(22) Filed: Apr. 19, 2000

(30) Foreign Application Priority Data

Apr. 23, 1999  (GB) .............................. 9909425

(51) Int. Cl.$^7$ .............................................. G10L 21/02
(52) U.S. Cl. ..................................... 704/227; 381/94.3
(58) Field of Search ............................. 704/226–228, 704/233; 379/94.3

(56) References Cited

U.S. PATENT DOCUMENTS

| | | | | |
|---|---|---|---|---|
| 4,628,529 A | * | 12/1986 | Borth et al. ................ | 381/94.3 |
| 4,811,404 A | * | 3/1989 | Vilmur et al. ............. | 381/94.3 |
| 5,604,839 A | | 2/1997 | Acero et al. ............... | 395/2.43 |
| 5,655,057 A | | 8/1997 | Takagi ........................ | 395/2.42 |
| 5,960,395 A | | 9/1999 | Tzirkel-Hancock ......... | 704/241 |
| 6,098,040 A | * | 8/2000 | Petroni et al. .............. | 704/234 |
| 6,230,122 B1 | * | 5/2001 | Wu et al. .................... | 704/226 |
| 6,542,864 B2 | * | 4/2003 | Cox et al. ................... | 704/212 |

FOREIGN PATENT DOCUMENTS

| | | |
|---|---|---|
| EP | 0789349 | 8/1997 |
| WO | WO 99/12155 | 3/1999 |

OTHER PUBLICATIONS

Tetsuo Kosaka et al., "Instantaneous Environment Adaptation Techniques Based on Fast PMC and Map–CMS Methods," IEEE (1998), pp. 789–792.

* cited by examiner

Primary Examiner—Richemond Dorvil
Assistant Examiner—Donald L. Storm
(74) Attorney, Agent, or Firm—Fitzpatrick, Cella, Harper & Scinto

(57) ABSTRACT

A speech processing apparatus and method are provided for processing an input speech signal to compensate for the effects of noise in the input speech signal. The method and apparatus divide the input speech signal into a plurality of sequential time frames and a set of spectral parameters are extracted for each time frame, which parameters are representative of the input signal during the time frame. The system then processes the input speech by scaling the parameters for each frame in dependence upon a measure of the signal to noise ratio for the input frame. In this way, the effects of additive noise on the input signal can be reduced.

142 Claims, 9 Drawing Sheets

SPEECH PROCESSING APPARATUS AND METHOD MEASURING SIGNAL TO NOISE RATIO AND SCALING SPEECH AND NOISE

The present invention relates to a speech processing apparatus ad method. The present invention is particularly concerned with processing the input speech signal to reduce the effects of noise in the input signal in subsequent processing operations, such as speech recognition or speaker verification.

Noise in an input speech signal is a common problem. The two main types of noise include additive noise, which is the effect of noise in the background being added to the input speech signal and convolutive noise, which is caused by channel mismatch between the training utterance and the utterance to be processed.

The present invention aims to provide a speech processing system which can reduce the effects of, at least, additive noise on subsequent processing operations. Preferred embodiments aim to reduce the effects of both additive and convolutive noise on subsequent processing operations.

According to one aspect, the present invention provides a speech processing apparatus comprising: means for receiving an input signal comprising speech components and noise components; means for calculating a measure of the signal to noise ratio (SNR) for the input signal; and means for scaling the input signal in dependence upon the calculated measure of the signal to noise ratio.

In a preferred embodiment, this aspect also provides a speech processing apparatus comprising: means for receiving an input signal comprising speech components and noise components; means for dividing the input signal into a plurality of time frames; means for extracting a plurality of parameters for each time frame, which parameters are representative of the input signal during the time frame; and means for processing the parameters for each time frame to compensate for the effects of said noise components on said speech components; characterised in that said processing means is operable to scale the parameters within each frame in dependence upon a measure of the signal to noise ratio of said speech components and said noise components.

According to a further aspect, the present invention provides a speech processing apparatus comprising: means for receiving an input signal comprising speech components and noise components means for dividing the input signal into a plurality of time frames; means for extracting a plurality of parameters for each time frame, which parameters are representative of the input signal during the one frame; and means for processing the parameters for each time frame to compensate for the effects of said noise components on said speech components; characterised in that said processing means is operable to subtract a set of average parameters representative of an average input frame, from the parameters within each frame in dependence upon a measure of the signal to noise ratio of said speech components and said noise components.

The present invention also provides corresponding speech processing methods and can be implemented either using dedicated hardware circuits or can be implemented using computer software run in conjunction with programmable processing hardware.

Exemplary embodiments of the invention will now be described with reference to the accompanying drawing in which.

Embodiments of the present invention can be implemented using dedicated computer hardware circuits, but the embodiment to be described is implemented in software which is run in conjunction with processing hardware such as a personal computer, workstation, photocopier, facsimile machine or the like. The software may form part of an operating system for use with a multifunctional computer system.

Figure 1:
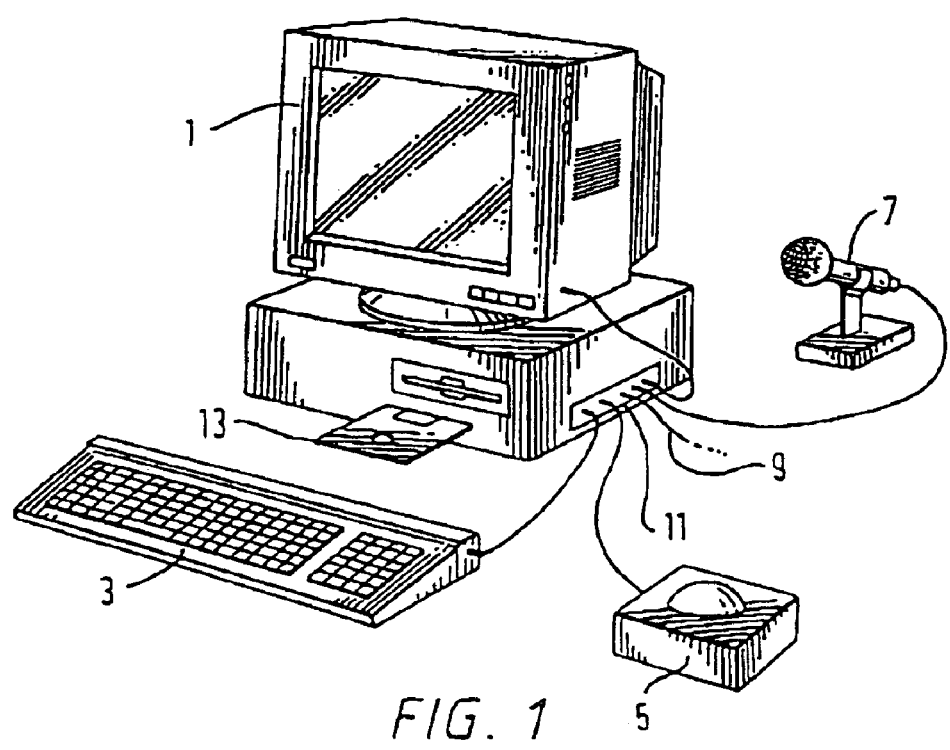
FIG. 1 is a schematic view of a computer which may be programmed to operate an embodiment of the present invention.

FIG. 1 shows a personal computer (PC) 1 which is programmed to operate an embodiment of the present invention. A keyboard 3, a pointing device 5, a microphone 7 and a telephone line 9 are connected to the PC 1 via an interface 11. The keyboard 3 and pointing device 5 enable the system to be controlled by a user. The microphone 7 converts the acoustic speech signal of the user into an equivalent electrical signal and supplies this to the PC 1 for processing. An internal modem and speech receiving circuit (not shown) may be connected to the telephone line 9 so that the PC 1 can communicate with, for example, a remote computer or with a remote user.

The programs instructions which make the PC 1 operate in accordance with the present invention can be supplied for use with an existing PC 1 on, for example a storage device such as a magnetic disc 13, or by downloading the software as an electronic signal from the Internet (not shown) via the internal modem and the telephone line 9.

Figure 2:
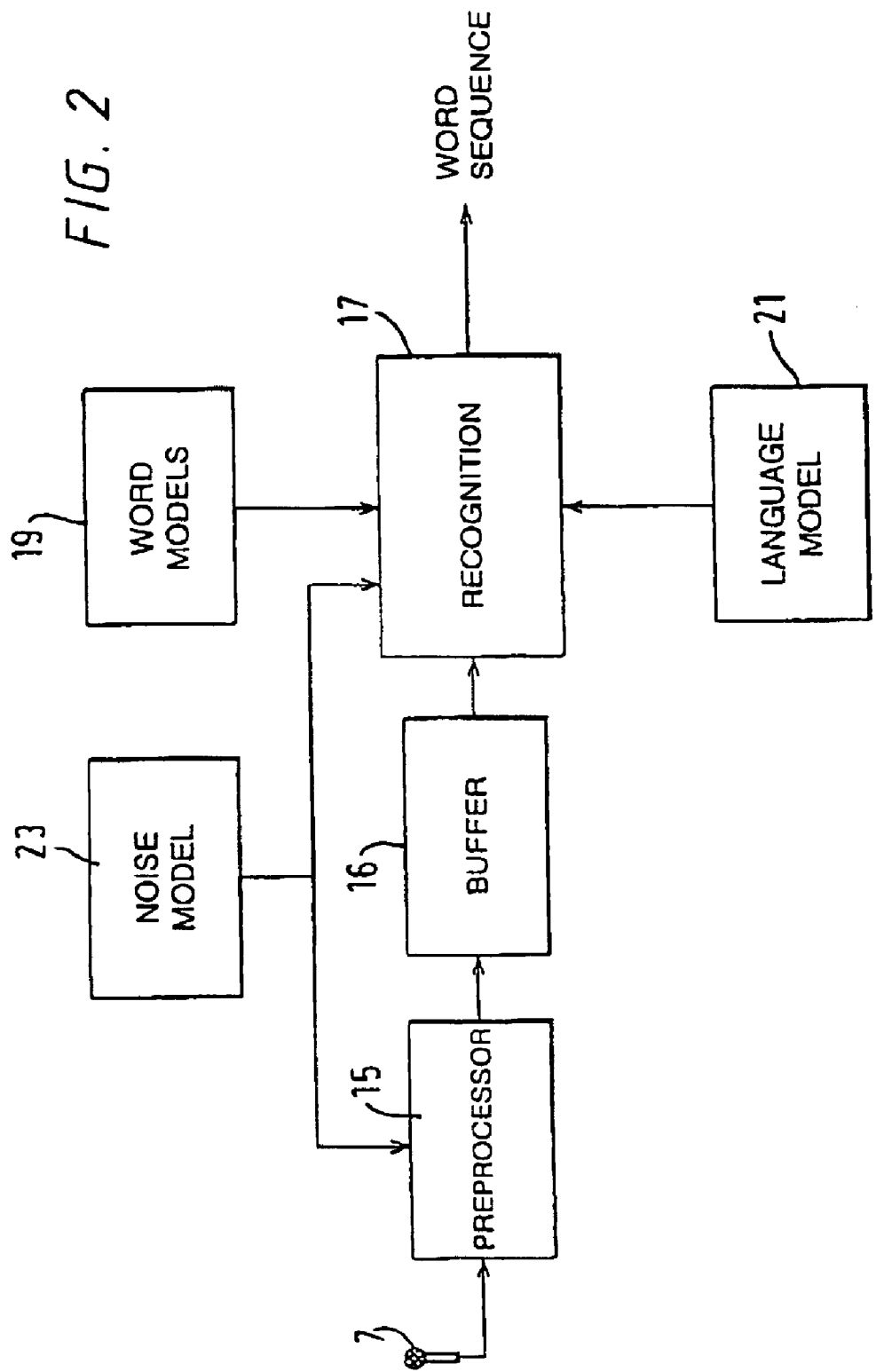
FIG. 2 is a schematic overview of a speech recognition system.

The operation of the speech recognition system of this embodiment will now be briefly described with reference to FIG. 2. A more detailed description of the speech recognition system can be found in the Applicant's earlier European patent application EP 0789349, the content of which is hereby incorporated by reference. Electrical signals representative of the input speech from, for example, the microphone 7 are input to a preprocessor 15 which converts the input speech signal into a sequence of parameter frames, each representing a corresponding time frame of the input speech signal. The sequence of parameter frames are then supplied, via buffer 16, to a recognition block 17 where the speech is recognised by comparing the input sequence of parameter frames with reference models or word models 19, each model comprising a sequence of parameter frames expressed in the same kind of parameters as those of the input speech to be recognised.

In this embodiment, a language model 21 and a noise model 23 are also provided as inputs to the recognition block 17 to aid in the recognition process. The noise model is representative of silence or background noise and, in this embodiment, comprises a single parameter frame of the same type as those of the input speech signal to be recognised. The language model 21 is used to constrain the allowed sequence of words output from the recognition block 17 so as to conform with sequence of words known to the system. The word sequence output from the recognition block 17 may then be transcribed for use in, for example, a word processing package or can be used as operator commands to initiate, stop or modify the action of the PC 1.

As mentioned above, the present invention is concerned with processing the input speech signal in order to reduce the effect of noise on the recognition process. In this embodiment, this processing of the speech signal is carried out in the preprocessor 15. A more detailed description of the preprocessor block 15 will, therefore, now be given.

PREPROCESSOR

Figure 3:
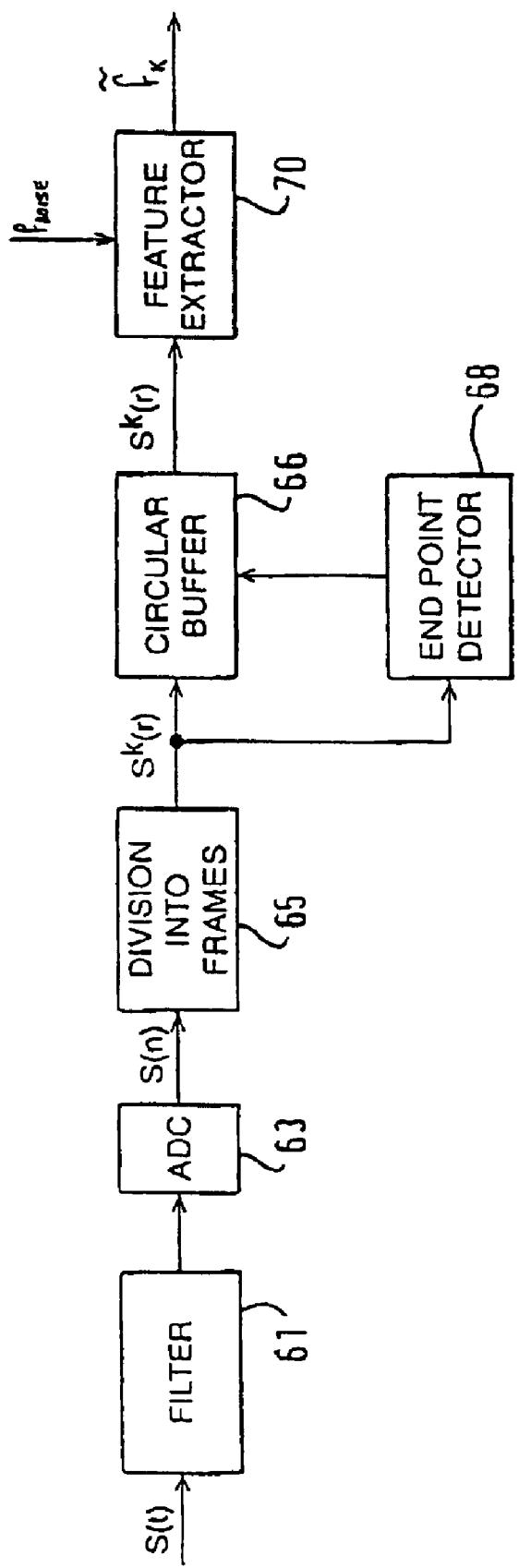
FIG. 3 is a block diagram of the preprocessor incorporated as part of the system shown in FIG. 2, which illustrates some of the processing steps that are performed on the input speech signal.

The functions of the preprocessor 15 are to extract the information required from the speech and to reduce the amount of data that has to be processed. There are many different types of information which can be extracted from the input signal. In this embodiment the preprocessor 15 is designed to extract "format" related information. Formants are defined as being the resonant frequencies of the vocal tract of the user, which change as the shape of the vocal tract changes when the user is talking. FIG. 3 shows a block diagram of the main parts of the preprocessor is. Input speech S(t) from the microphone 7 or the telephone line 9 is supplied to filter block 61, which removes frequencies within the input speech signal that contain little meaningful information Most of the information useful for speech recognition is contained in the frequency band between 300 Hz and 4 Kz. Therefore, filter block 61 removes all frequencies outside this frequency band. Since no information which is useful for speech recognition is filtered out by the filter block 61, there is no loss of recognition performance. Further, in same environments, for example in a motor vehicle, most of the background noise is below 300 Hz and the filter block 61 can result in a effective increase in signal-to-noise ratio of approximately 10 dB or more. The filtered speech signal is then converted into 16 bit digital samples by the analogue-to-digital converter (ADC) 63. To adhere to the Nyquist sampling criterion, ADC 63 samples the filtered signal at a rate of 8000 times per second.

After the input speech has been sampled it is divided into equal length frames in block 65. The reason for this division of the input speech into frames will now be described in more detail. As mentioned above, during continuous speech the formant related information changes continuously, the rate of change being directly related to the rate of movement of the speech articulators which is limited by physiological constraints. Therefore, in order to track the changing formant frequencies, the speech signal must be analysed over short time periods or frames, this method being known in the art of speech analysis as a "short time" analysis of speech.

There are two considerations that have to be addressed when performing a short time analysis: (i) what rate should the time frames be extracted from the speech signal, and (il) how large a time frame should be used.

The first consideration depends on the rate of movement of the speech articulators i.e. the frames should be sufficiently close to ensure that important events are not missed and to ensure that there is reasonable continuity. The second consideration is determined by a compromise between the time frame being short enough so that the speech signal's properties during the frame are constant, and the frame being long enough to give sufficient frequency detail so that the formants can be distinguished.

In this embodiment, in order to reduce the amount of computation required, both in the front end processing and later in the recognition stage, non-overlapping frames of 128 samples (corresponding to 16 milliseconds of speech) are directly extracted from the speech without a conventional windowing function. In a conventional system, overlapping frames are usually extracted using a window function which reduces frequency distortions caused by extracting the frames from the speech signal.

The applicant has found, however, that with non-overlapping frames, these conventional windowing functions worsen rather than improve recognition performance.

The speech frames $S^k(r)$ output by the block 65 are then written into a circular buffer 66 which can store sixty-two frames corresponding to approximately one second of speech. The frame written in the circular buffer 66 are also passed to an endpoint detector 68 which process the frames to identify when the speech in the input signal begins and, after it has begun, when it ends. Until speech is detected within the input signal, the frames in the circular buffer are not fed to the computationally intensive feature extractor 70. However, when the endpoint detector 68 detects the beginning of speech within the input signal, it signals the circular buffer to start passing the frames received after the start of speech point to the feature extractor 70, which then extracts a set of parameters (feature vector) for each frame which are representative of the speech signal within the frame. The end point detector used may be a standard point detector which monitors the energy in the received signal and indicates the beginning of speech when the energy exceeds a predefined threshold. Preferably, however, the endpoint detector operates in accordance with the applicant's co-pending British application GB 9822932.1, the contents of which are hereby incorporated by reference.

Figure 4:
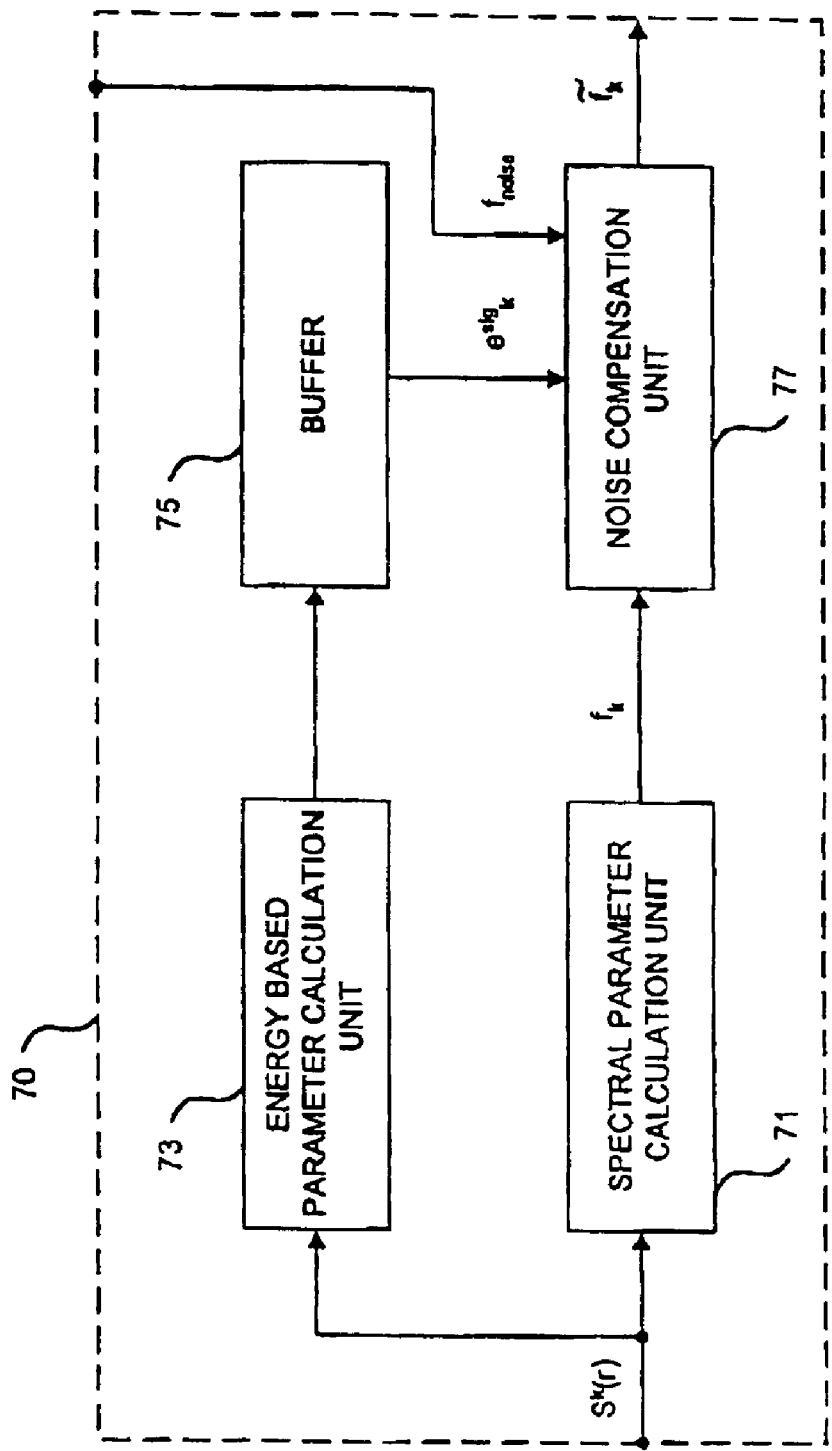
FIG. 4 is a schematic block diagram illustrating the principal components of a feature extractor forming part of the preprocessor shown in FIG. 3.

In this embodiment, the feature vector ($\bar{f}_k$) determined by the feature extractor 70 comprises nine cepstral coefficients for each frame of input speech. As those skilled in the art are aware, the values of the cepstral coefficients depend upon the above mentioned formants during the corresponding frame of input speech. In this embodiment, the feature extractor 70 is also operable to process each cepstral coefficient in each frame in order to try to remove noise from the coefficient values. FIG. 4 shows in more detail the principal components of the feature extractor 70. As shown, the frames of speech $S^k(r)$ from the circular buffer 66 are input to a spectral parameter calculation unit 71 and an energy based parameter calculation unit 73. The spectral parameter calculation unit 71 calculates the nine cepstral coefficients $[C_1, C_2, C_3, C_4 \ldots C_9]$ discussed above. The way in which the spectral parameter calculation unit 71 performs this operation is well known in the art of speech recognition and is described in co-pending British application GB 9822932.1 and will not, therefore, be described further here. The energy based parameter calculation unit 73 calculates a parameter which is indicative of the energy of the input signal within the current frame being processed. In this embodiment, this energy based parameter is the average magnitude of the input signal during the frame, which is given by:

$$e_k^{sig} = \frac{1}{N}\sum_{r=1}^{N} |S^k(r)| \quad (1)$$

where N is the number of samples within each frame (which in this embodiment is 128). The average magnitude is calculated in this embodiment, since it avoids the need for the calculation of squares which would be necessary to calculate the actual energy of the input signal within the frame. This average magnitude value for the current frame is then stored in the buffer 75 for use by the noise compensation unit 77. In this embodiment, the buffer 75 stores the average magnitude values for the previous 62 frames, corresponding to one second of input signal.

Figure 5:
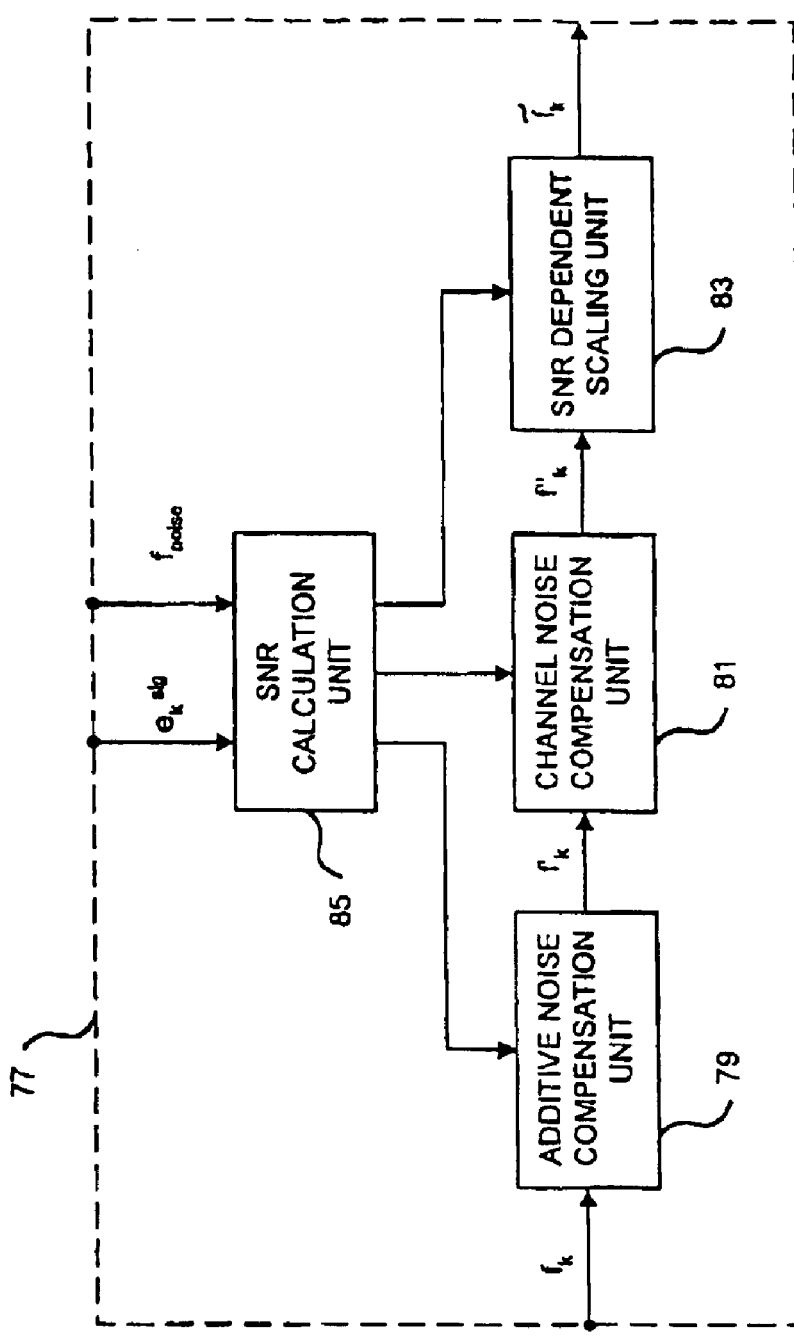
FIG. 5 is a schematic block diagram illustrating the principal components of a noise compensation unit forming part of the feature extractor shown in FIG. 4.

The noise compensation unit 77 receives the nine cepstral coefficients output by the spectral parameter calculation unit 71 and performs a respective correction on each of the cepstral coefficients in order to try to compensate for noise in the cepstral coefficient. In this embodiment, the noise compensation unit 77 is operable to compensate for both additive noise (background noise) and convolutive noise (channel noise), FIG. 5 shows in more detail the principal components of the noise compensation unit 77 shown in FIG. 4. As shown, the feature vector ($f_k$) for the current frame (k) output by the spectral parameter calculation unit 71 is input to an additive noise compensation unit 79 which processes the feature vector to reduce the effect of additive noise therein. The feature vector ($f'_k$) output by the additive noise compensation unit 79 is then input to a channel noise compensation unit 81 which is operable to process the received feature vector to reduce the effect of channel noise therein. The feature vector ($f''_k$) output by the channel noise compensation unit 81 is then scaled by a signal-to-noise ratio dependent scaling unit 83 which is operable to make a further correction for additive noise and to output the noise corrected feature vector ($\hat{f}_k$) for the current frame.

Each of these processing units will now be described in more detail with reference to FIGS. 6 to 10.

ADDITIVE NOISE COMPENSATION UNIT

Additive noise is the effect of noise in the background being added to the speech signal. The additive noise compensation unit performs a correction for this noise based on the following observations:

(1) when the current frame energy is close to or less than the mean noise energy, the cepstral coefficients for the current frame are biased towards the mean noise cepstral coefficients (i.e. the mean cepstral coefficients obtained when there is just background noise in the input signal); and (2) when the current frame energy is much larger than the mean noise energy, the effect of additive noise diminishes.

Figure 6:
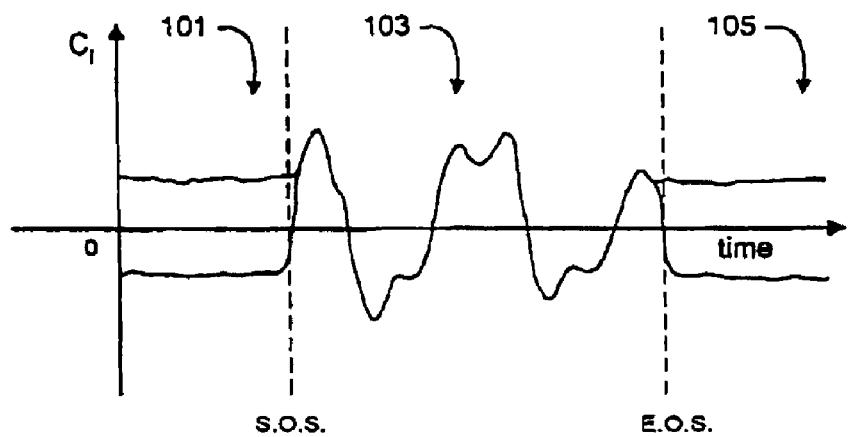
FIG. 6 is a plot showing the way in which a cepstral coefficient output by the feature extractor shown in FIG. 3 varies over two input utterances having different background noise levels when the noise compensation unit shown in FIG. 5 is switched off.

These observations are illustrated in FIG. 6. In particular, FIG. 6 shows the way in which the value of one of the cepstral coefficients ($C_i$) varies for the same spoken utterance with two different background noise conditions. The beginning of the utterance within the input signal is indicated by the vertical dashed line labelled S.O.S. (start of speech) and the end is indicated by the vertical line labelled E.O.S (end of speech). As shown in FIG. 6, in the region 103 between the start of speech and the end of speech, $C_L$ varies in the same manner regardless of the level of background noise. However, when there is no speech in the input signal (at regions 101 and 105), the value of the cepstral coefficient $C_i$ stays approximately constant at a level dictated by the average background noise for the respective utterance. In particular, the value of the cepstral coefficient $C_i$ in regions 101 and 105 is biased towards the corresponding mean noise cepstral coefficient ($n_i$) for the particular utterance. This mismatch of the values of the cepstral coefficients in the regions 101 and 105 can result in recognition errors. Further, as those skilled in the art will appreciate, this problem is not restricted to noise at the beginning and the end of the speech utterance portion, but can also occur during an utterance since speech signals naturally contain brief pauses. In addition, low energy speech sounds such as fricatives can be significantly affected by noise.

Based on these observations, the additive noise compensation unit 79 performs a compensation which is dependent upon the signal-to-noise ratio for the current frame being processed. In particular, the additive noise compensation unit 79 subtracts the average noise feature vector ($f_{noise}$) from the feature vector ($f_k$) for the current frame when there is a low signal-to-noise ratio and performs no correction when there is a high signal-to-noise ratio. More specifically, the noise compensation unit 79 performs the following calculation:

$$f'_k = f_k - g(SNR_k) \cdot f_{noise} \quad (2)$$

$$= \begin{bmatrix} C'_1 \\ C'_2 \\ C'_3 \\ \vdots \\ C'_9 \end{bmatrix} = \begin{bmatrix} C_1 \\ C_2 \\ C_3 \\ \vdots \\ C_9 \end{bmatrix} - g(SNR_k) \cdot \begin{bmatrix} n_1 \\ n_2 \\ n_3 \\ \vdots \\ n_9 \end{bmatrix}$$

where $f_{noise}$ is the average noise feature vector, which is determined from a sample of the input signal when the user is silent and $g(SNR_k)$ is a function which is calculated for each frame and, in this embodiment, equals zero when the signal-to-noise ratio for the current frame is high (so that no compensation is performed on the current frame) and equals one when the signal-to-noise ratio for the current frame is less than or equal to zero (so that the mean noise cepstral coefficients ($n_i$) are subtracted from the cepstral coefficients for the current frame). In this embodiment, $g(SNR_k)$ is given by:

$$g(SNR_k) = \begin{cases} \exp(-\beta \cdot SNR_k) & SNR_k > 0 \\ 1 & SNR_k \leq 0 \end{cases} \quad (3)$$

where β is an empirically chosen constant (which, in this embodiment, has a value of one) and $SNR_k$ is a measure of the signal-to-noise ratio for the current frame being processed. In this embodiment, the signal-to-noise calculation unit 85 calculates this measure using the average magnitude ($e_k^{sig}$) for the current frame being processed (which was calculated by the energy based parameter calculation unit 73 and which is stored in buffer 75) and the average noise magnitude ($e^{noise}$), "which is calculated from samples of the input signal before the speech detector identifies the start of the utterance using equation (1) above. In particular, the signal-to-noise ratio calculation unit 85 calculates the following:

$$SNR_k = ln[e_k^{sig}] - ln[e^{noise}] \quad (4)$$

Figure 7:
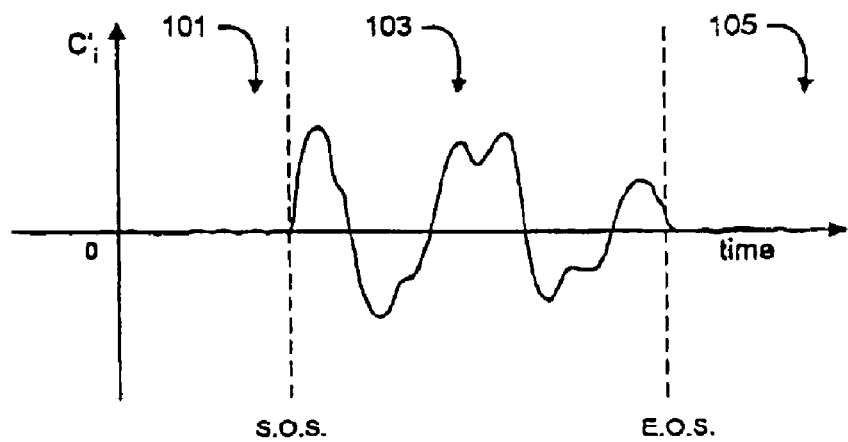
FIG. 7 is a plot of the compensated cepstral coefficient shown in FIG. 6 output by an additive noise compensation unit forming part of the noise compensation unit shown in FIG. 5.
Figure 8:
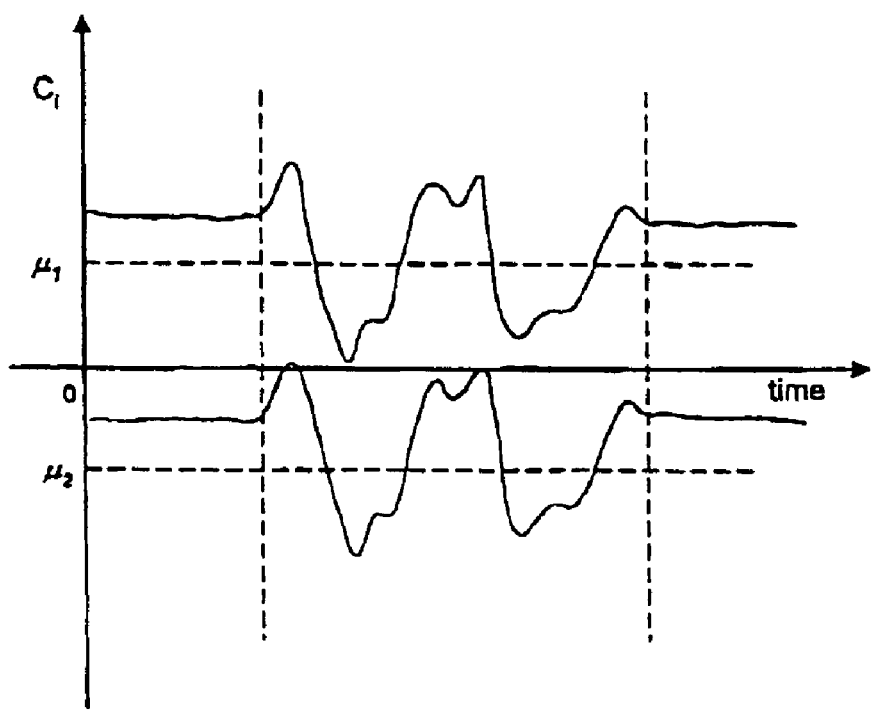
FIG. 8 is a plot showing how a cepstral coefficient output by the feature extractor shown in FIG. 3 varies in two utterances of the same word but with a different channel between the speaker and the speech processing apparatus and with the compensation unit shown in FIG. 5 is switched off.

FIG. 7 in a plot illustrating the way in which the processed cepstral value ($C'_i$) output by the additive noise compensation unit 79 varies within the same utterance as for FIG. 6. As shown in region 103, corresponding to the spoken utterance, the processed cepstral coefficient C'$_i$ in the same way as the unprocessed cepstral coefficient C$_i$ (shown in FIG. 6) varied, whilst in regions 101 and 105, the processed cepstral coefficient C'$_i$ is biased towards zero, rather than the average noise level during the input of the utterance. Therefore, if the feature vectors generated during training and during recognition are both processed in this way, then errors caused by different levels of background noise in the input signals can be reduced.

CHANNEL NOISE COMPENSATION UNIT

Convolutive noise is caused by channel mismatch between the time at which training is being performed and the time at which recognition is being performed. For example, convolutive noise occurs if different microphones are used for the training stage and the subsequent recognition stage or if the training stage is carried out with a microphone and the subsequent recognition is carried out via a telephone line. In this embodiment, an improved form of cepstral mean subtraction (CMS) is employed. In the standard CMS algorithm, the mean feature vector (cepstral mean) for an utterance (which represents a mean frame in the input utterance) is calculated and subtracted from each feature vector for the utterance. The philosophy behind the standard CMS compensation technique is that a linear channel mismatch results in a constant relative offset for each cepstral coefficient between the training utterance and the subsequent input utterance to be recognized. Subtracting the cepstral mean forces the mean of the processed cepstral coefficients to zero for both input and training utterances and thereby removes any channel mismatch.

However, the basic CMS technique suffers from two problems. The first is that it requires the whole utterance before it can perform channel compensation. This means that frames of an input utterance cannot be processed until after the input speech has ended and therefore the responsiveness of the system is significantly reduced. The second problem is that the basic assumption that channel mismatch introduces a constant offset for each cepstral coefficient between the input and training utterances is incorrect in the presence of noise. The investors have noted that here the signal-to-noise ratio for a current frame being processed is low, the cepstral values for that frame are dominated by noise and there is no offset and that it is only frames with a high signal-to-noise ratio that exhibit this offset. Therefore, the enhanced CMS technique employed in this embodiment performs a signal-to-noise ratio dependent subtraction of the cepstral mean using the following equation:

$$f_k'' = f_k' - [1 - g(SNR_k)] \cdot f_{mean} \quad (5)$$

$$\begin{bmatrix} C_1'' \\ C_2'' \\ C_3'' \\ \vdots \\ C_9'' \end{bmatrix} = \begin{bmatrix} C_1' \\ C_2' \\ C_3' \\ \vdots \\ C_9' \end{bmatrix} - [1 - g(SNR_k)] \cdot \begin{bmatrix} \overline{C}_1 \\ \overline{C}_2 \\ \overline{C}_3 \\ \vdots \\ \overline{C}_9 \end{bmatrix}$$

where $f_{mean}$ is the cepstral mean feature vector, $g(SNR_k)$ is a function which is calculated for each frame and, in this embodiment, equals zero when the signal-to-noise ratio for the current frame is high (so that the cepstral mean is subtracted from the cepstral coefficients for the current frame) and equals one when the signal-to-noise ratio for the current frame is less than or equal to zero (so that no compensation is performed for the current frame). In this embodiment, $g(SNR_k)$ used by the channel compensation unit 81 is the same as $g(SNR_k)$ used by the additive noise compensation unit 79 and $SNR_k$ is the same measure of the signal-to-noise ratio which was used by the additive noise compensation unit 79.

In this embodiment the speech recognition system is designed to operate in a substantially real time manner. As a result, it is not possible to wait for the whole utterance to be input before calculating the cepstral mean ($f_{mean}$). Therefore, in this embodiment, the cepstral mean ($f_{mean}$) is estimated from:

$$f_{mean} = \frac{\sum_{p=1}^{N} f_p'(1 - g(SNR_p))}{\sum_{p=1}^{N} [(1 - g(SNR_p))^2] + \tau} \quad (6)$$

where N is the number of frames since the start of speech. A those skilled in the art will appreciate, this estimate is weighted so as to give more weight to frames with a high signal to noise ratio. The calculation is performed frame synchronously in real time, thereby allowing the speech recognition processing to also take place in real-time. Unfortunately, this means that near the start of the utterance there are only a few frames in the summation and the estimate of the cepstral mean ($f_{mean}$) is unreliable. Therefore, to avoid subtracting an unreliable estimate, $f_{mean}$ is biased towards zero when N is small by using the parameter $\tau$, which, in this embodiment has a value typically between five and twenty depending upon the amount of channel mismatch. In particular, in this embodiment, $\tau$ has a value nearer five when there is a large channel mismatch and a value of twenty when there is a small mismatch caused by, for example, different room acoustics. Although this results in little or no channel correction being performed near the start of the utterance, the above compensation has been found to be effective in compensating for channel mismatch while still allowing all the benefits of real-time processing of the input speech.

SNR DEPENDENT SCALING UNIT

The SNR dependent scaling unit is provided in order to provide further robustness against additive noise. The scaling is performed based on the observation that when the energy of the current frame being processed is close to or less than the mean noise energy, the standard deviation of each cepstral coefficient for the current frame is reduced in the presence, of additive nose. The compensation performed by the SNR dependent scaling unit 83 tries to correct for this variation so that the standard deviation of a given cepstral coefficient in a frame is the same for an input utterance as it is for a training utterance. As will be explained below, this is achieved by multiplying the feature vector for the current frame with a signal-to-noise ratio dependent scaling factor.

In this embodiment, the signal-to-noise ratio dependent variation of the standard deviation of each cepstral coefficient is modelled by the following equation:

$$\sigma_i(SNR_k) = \left[1 - \frac{g(SNR_k)}{\alpha}\right] \cdot \sigma_i(SNR_k) \quad (7)$$

where $\sigma_i(SNR_k)$ is the standard deviation of cepstral coefficient $C_i$ in the current frame (k) being processed, $\sigma_i(SNR)$ is the standard deviation of cepstral coefficient $C_i$ when there is no noise, $\alpha$ is an empirically determined constant (which in this embodiment equals two) and $g(SND_k)$ is a function which is calculated for each frame and, in this embodiment, equals zero when the signal-to-noise ratio for the current frame is high and equals one when the signal-to-noise ratio for the current frame is less than or equal to zero. In this embodiment, $g(SNR_k)$ is the same function as the one used by the additive noise compensation unit 79 and the channel noise compensation unit 81. Therefore, when the signal-to-noise ratio for the current frame is high the standard deviation of each cepstral coefficient for the current frame is the same as the standard deviation when there is no noise and when the signal-to-noise ratio for the current frame is low the standard deviation of each cepstral coefficient is half the standard deviation of the corresponding cepstral coefficient when there is no noise.

In order to equalise the standard deviation of the cepstral coefficient for an input utterance during recognition and for a training utterance, a target standard deviation ($\sigma^T_i$ ($SNR_k^{target}$) is firstly defined and then a mapping function which maps the actual standard deviation of the cepstral coefficient to this target standard deviation is determined. In particular, if a target standard deviation is defined by:

$$\sigma^T_i(SNR_k^{target}) = \left[1 - \frac{g(SNR_k^{target})}{\alpha}\right] \cdot \sigma_i(SNR_k) \qquad (8)$$

then by dividing equation 8 by equation 7 gives:

$$\sigma^T_i(SNR_k^{target}) = \frac{[\alpha - g(SNR_k^{target})]}{[\alpha - g(SNR_k)]} \cdot \sigma_i(SNR_k) \qquad (9)$$

which maps the standard deviation for a cepstral coefficient of the current frame being processed to this target standard deviation.

In this embodiment, this signal-to-noise ratio dependent mapping (scaling) of the standard deviation for the current frame to the target standard deviation is directly used to scale the cepstral coefficients received from the channel noise compensation unit 81. This is valid, since the mean of the cepstral coefficients output by the channel noise compensation unit 81 are zero and therefore, this scaling will only affect the standard deviation of the coefficients and not their mean value. In other words, the signal-to-noise ratio dependent scaling unit 83 performs the following compensation:

$$\overline{f}_k = \frac{[\alpha - g(SNR_k^{target})]}{[\alpha - g(SNR_k)]} \cdot f''_k \qquad (10)$$

$$\begin{bmatrix} \overline{C}_1 \\ \overline{C}_2 \\ \overline{C}_3 \\ \vdots \\ \overline{C}_9 \end{bmatrix} = \frac{[\alpha - g(SNR_k^{target})]}{[\alpha - g(SNR_k)]} \cdot \begin{bmatrix} C''_1 \\ C''_2 \\ C''_3 \\ \vdots \\ C''_9 \end{bmatrix}$$

The final task is to define the target signal-to-noise ratio ($SNR_k^{target}$). In this embodiment, the target signal-to-noise ratio is calculated from:

$$SNR_k^{target} = \ln[e_k^{rig}] - \ln[e^{targ.noise}] \qquad (11)$$

where $e^{targ.noise}$ is a target noise floor which, in this embodiment, is a constant for an input utterance and is calculated as a constant amount (Y) below the peak frame energy within the utterance. This constant Y is an empirically chosen constant. If Y is too large, then noisy frames are given more weight and if it is too small, then clean frames are made more noisy (by being scaled down). In this embodiment Y has a value of 2.5. As mentioned above, the speech recognition system of this embodiment is designed to operate in a substantially real time manner. Therefore, it cannot wait to receive the whole input utterance before determining the peak frame energy for the utterance. However, this is not a problem, since the peak frame energy within an utterance is normally observed within a few frames of the detection of the onset of speech. Therefore, by storing the frame energies for 20 frames in buffer 75, a good estimate of the maximum frame energy within the utterance can be determined by determining the maximum frame energy which is stored in the buffer 75. This estimate of the maximum frame energy is then used to determine the noise floor in the manner discussed above.

Figure 9:
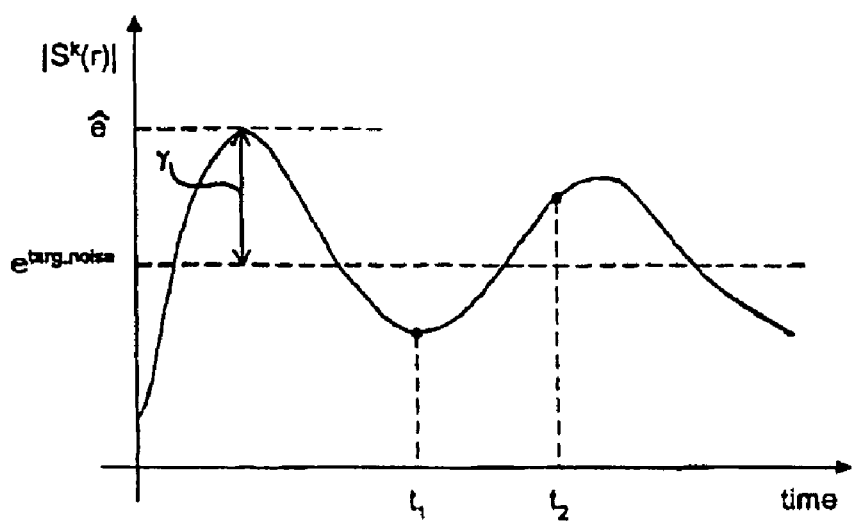
FIG. 9 is a plot illustrating the way in which the frame energy varies within an input speech utterance

FIG. 9 shows the way in which the energy in an input utterance varies during the utterance. FIG. 9 also shows the target noise floor which is determined from the peak frame energy ($\overline{e}$). The effect of the scaling performed in equation 10 above is that the cepstral coefficients for frames below the target noise floor, such as the frame at time $t_f$, will be halved (since $\alpha=2$) while those above the target noise floor, such an the frame at time $t_f$, are not scaled and those around the target noise floor are scaled by a factor between a half and one. The inventors have found that this signal-to-noise ratio dependent scaling of the cepstral coefficients leads to a speech recognition system which is more robust to additive noise because the features during training and recognition are mapped to a common overall signal to noise ratio.

The adjusted feature vector ($\overline{f}_k$) output by the signal-to-noise ratio dependent scaling unit 83 is then output by the feature extractor 77 and input to the buffer 16 for processing by the recognition unit 17. The operation of the recognition unit 17 is not important to the present invention and will not, therefore, be described further. The recognition unit 17 may be, for example, any standard speaker dependent or speaker independent continuous or isolated speech recognition system. One type of speech recognition system which may be employed is described in the applicant's earlier European application EP 0789349 mentioned above.

ALTERNATIVE EMBODIMENTS

Figure 10:
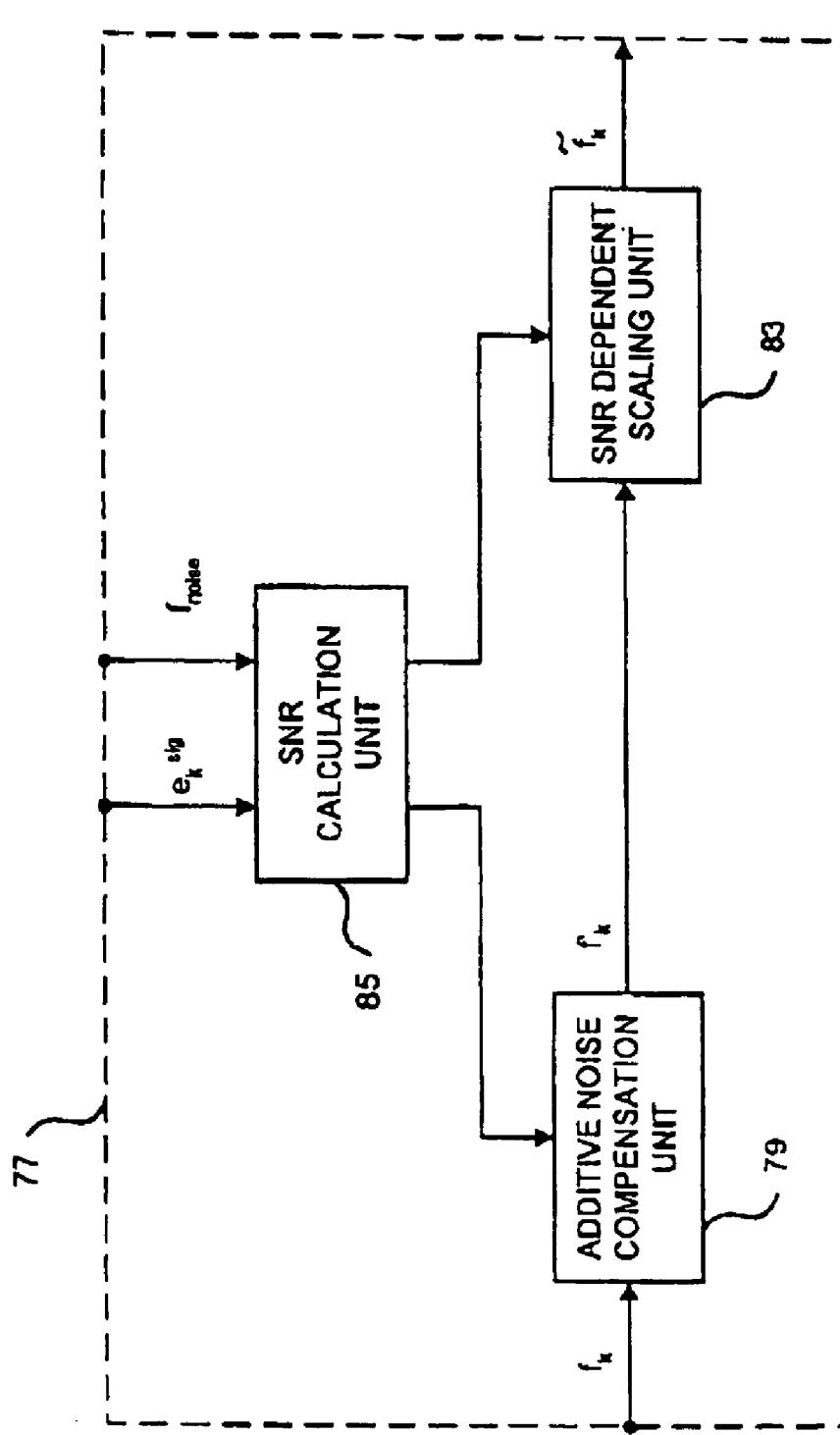
FIG. 10 is a block diagram illustrating the form of an alternative noise compensation unit.

In the above embodiment, the noise compensation unit 77 compensated for both additive and channel noise disturbances. FIG. 10 shows the form of a noise compensation unit according to a second embodiment of the invention which performs compensation for only additive noise. As shown in FIG. 10, the noise compensation unit 71 in this embodiment, only comprises the additive noise compensation unit 79 and the SNR dependent scaling unit 83. The corrections performed by these units are the same as performed in the first embodiment and will not, therefore, be described again. It should be noted, however, that since there is no channel noise compensation, the cepstral mean feature vector is not subtracted from each input feature vector. Therefore, the signal-to-noise ratio dependent scaling can introduce some distortion if the cepstral mean of the input utterance is not near zero. However, this can be avoided by suitable processing of the input speech signal before the noise compensation unit through appropriate pre-emphasis and filtering circuits. Alternatively, in a system which does not operate in real time, the system can calculate the mean cepstral feature vector for each input utterance and subtract this from each feature vector.

Figure 11:
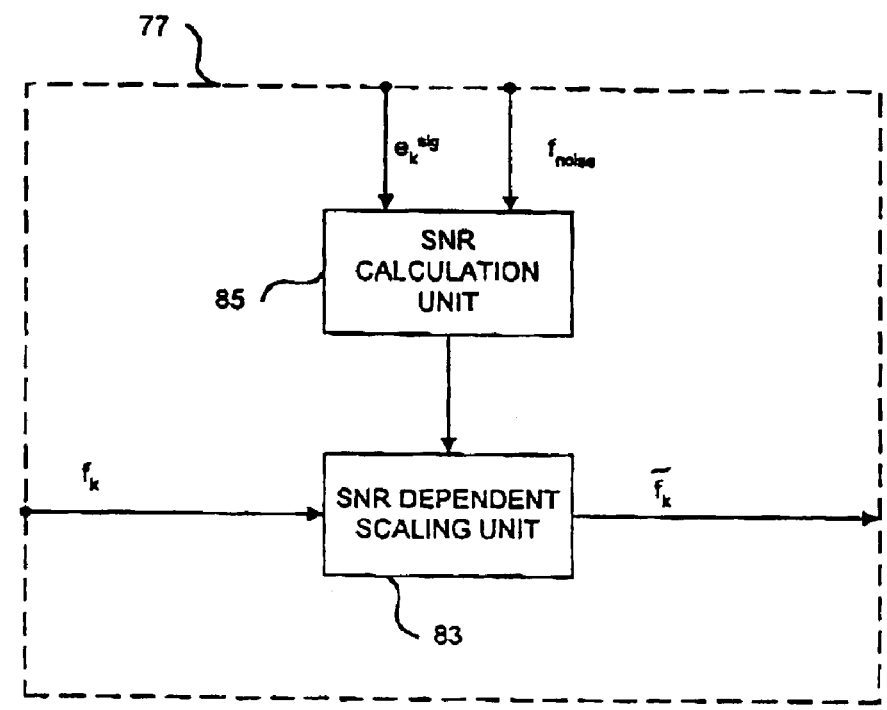
FIG. 11 is a block diagram illustrating the form of another noise compensation unit.

FIG. 11 shows a further alternative noise compensation unit 77 which only performs the signal-to-noise ratio dependent scaling compensation performed by the scaling unit 83. Again, similar considerations should be taken with regard to the mean cepstral feature vector for each utterance, in order to avoid distortion being introduced by the scaling unit 33. Further, although not illustrated, each of the three compensations discussed above in the first embodiment, can be performed on their own or in any combination.

In the above embodiments, the above corrections were applied to the input utterances during training and during the subsequent recognition processing. As those skilled in the art of speech recognition will appreciate, it is not essential to perform the above corrections on the training data. In particular, if the corrections have not been applied to the training data, then an appropriate adjustment can be made to the compensation performed. For example, in such an embodiment, the additive noise compensation unit 79 shown in FIG. 5 would perform the following compensations:

$$f_k' = f_k - g(SNR_k) \cdot [\bar{f}_{noise} \bar{f}_{noise}] \quad (12)$$

where $\bar{f}_{noise}$ is the average noise feature vector for the training speech. Similar adjustments could also be made for the compensations performed by the channel noise compensation unit 81 and the SNR dependent scaling unit 83.

In the above embodiment, the speech recognition system was designed to operate in a substantially real time manner. This is not essential. The whole input utterance may be received before the recognition processing. In this case, the cepstral mean feature vector and the peak frame energy within the utterance can be determined before any corrections are performed.

In the above embodiments, cepstral coefficients were used to model the speech within each frame. As those skilled in the art will appreciate, the above noise compensations can be performed on other types of spectral coefficients, such as filter bank coefficients or coefficients from a linear predictive analysis.

In the above embodiments, for the signal to noise ratio dependent scaling compensation, a target noise level was defined relative to the maximum frame energy found at the start of the speech signal. This target noise floor was then used as a constant noise level for the whole input utterance. In an alternative embodiment, the energy of the frames in the input utterance can be continuously monitored and the target noise floor can be recalculated if the system identifies a frame having a frame energy greater than the peak frame energy previously calculated.

In the above embodiments, the signal to noise ratio measure was a constant for each frame. In an alternative embodiment, a measure of the signal to noise ratio for different frequency bands in the input frame can be determined. In such an embodiment, the function $g(SNR_k)$ would have a respective value for each cepstral coefficient of the frame being processed.

In the above embodiments, $\alpha$, $\beta$ and $y$ were empirically chosen constants and had the same value for each cepstral coefficient. In an alternative embodiment, one or more of these constants can have a different value for each of the cepstral coefficients in an input frame. Whilst such an embodiment is possible and may lead to better noise compensation, it is not preferred because of the added complexity.

In the above embodiments, the same signal to noise ratio dependent function ($g(SNR_k)$) was used in the different noise compensations being performed. This is not essential. A different signal to noise ratio dependent function can be used for each of the compensations performed. However, it is preferred to use the same function, since this reduces the number of calculations required.

As those skilled in the art will appreciate, the noise compensation techniques described above can be used in various speech processing applications other than speech recognition. For example, the compensation described in this application may be used in speaker verification systems.

The Invention claimed is:

1. A speech processing apparatus comprising:
   means for receiving an input signal comprising speech components and noise components;
   means for calculating a measure of the signal to noise ratio (SNR) for the input signal; and
   means for scaling the input signal in dependence upon the calculated measure of the signal to noise ratio and in dependence upon a target SNR which is defined with reference to a target noise level.

2. An apparatus according to claim 1, wherein said scaling means is operable to apply a scaling or not to apply a scaling in dependence upon the SNR measure.

3. An apparatus according to claim 1, wherein said scaling means is operable to apply a scaling which varies exponentially with the measure of the SNR.

4. An apparatus according to claim 1, further comprising means for dividing the input signal into a plurality of time frames and for generating signals representative of the input signal in each time frame, wherein said calculating means is operable to calculate said SNR measure for the signals in each time frame and wherein said scaling means is operable to scale the signals in each time frame in dependence upon the SNR calculated for the time frame.

5. An apparatus according to claim 4, wherein said scaling means is operable to perform said scaling in dependence upon said target SNR and wherein said target noise level is determined as a predetermined level beneath the maximum measure of the frame energy within the input signal.

6. An apparatus according to claim 5, wherein said calculating means is operable to calculate a measure of the signal to noise ratio for a current frame using the following equation:

$$SNR_k = \ln[e_k^{sig}] - \ln[e^{noise}]$$

where $e_k^{sig}$ is a measure of the signal strength during the current frame and $e^{noise}$ is a measure of the background noise obtained by sampling the input signal when these is no speech component.

7. An apparatus according to claim 6, wherein the input signal within each time frame is sampled and wherein said calculating means is operable to calculate the measure of the signal strength within the current frame by summing the magnitudes of the samples within the current frame.

8. An apparatus according to claim 4, wherein said signals representative of the input signal in each time frame comprise a plurality of spectral parameters for the input signal in the frame.

9. An apparatus according to claim 8, wherein said spectral parameters comprise cepstral coefficients.

10. An apparatus according to claim 8, wherein said scaling means is operable to perform a scaling operation using the following equation:

$$\tilde{f}_k = \frac{[\alpha - g(SNR_k^{target})]}{[\alpha - g(SNR_k)]} \cdot f_k$$

where $f_k$ comprises the vector of spectral parameters, $\alpha$ is an empirically chosen constant, $g(SNR_k)$ is an exponential function of the signal to noise ratio measure calculated by said calculating means and $g(SNR_K^{target})$ is an exponential function of the target SNR.

11. An apparatus according to claim 10, wherein α is equal to two.

12. An apparatus according to claim 10, wherein said exponential function g( ) has the following form:

$$g(SNR_k) = \begin{cases} \exp(-\beta \cdot SNR_k) & SNR_k > 0 \\ 1 & SNR_k \leq 0 \end{cases}$$

where β is an empirically chosen constant.

13. An apparatus according to claim 1, wherein said scaling means is operable to scale said input signal in a substantially real time manner.

14. An apparatus according to claim 1, further comprising subtraction means for performing a signal to noise ratio dependent subtraction to the input signal.

15. An apparatus according to claim 14, further comprising means for dividing the input signal into a plurality of time frames and for generating signals representative of the input signal in each time frame, wherein said calculating means is operable to calculate said SNR measure for the signals in each time frame, wherein said scaling means is operable to scale the signals in each time frame in dependence upon the SNR calculated for the time frame and wherein said subtraction means is operable to subtract signals representative of background noise when the SNR measure for the time frame is below a predetermined value.

16. An apparatus according to claim 15, wherein said subtraction means is operable not to perform said subtraction when said SNR measure is high.

17. An apparatus according to claim 14, wherein said subtraction means is operable to perform a subtraction which varies exponentially with the measure of the SNR.

18. An apparatus according to claim 14, further comprising means for dividing the input signal into a plurality of time frames and for generating signals representative of the input signal in each time frame, wherein said calculating means is operable to calculate said SNR measure for the signals in each time frame, wherein said scaling means is operable to scale the signals in each time frame in dependence upon the SNR calculated for the time frame and wherein said subtraction means is operable to subtract signals representative of a mean frame of the input signal when the SNR measure for the time frame is high.

19. An apparatus according to claim 18, wherein said subtraction means is operable not to perform said subtraction of said signals representative of the mean frame when said SNR measure is below a predetermined threshold.

20. An apparatus according to claim 18, wherein said subtraction means is operable to perform said subtraction in a real time manner, and wherein said signals representative of the mean frame are estimated from previously received frames having a signal to noise ratio greater than a predetermined threshold.

21. An apparatus according to claim 20, wherein the estimated signals are biased towards zero for the first few frames of the input signal.

22. A speech processing apparatus comprising:
means for receiving an input signal comprising speech components and noise components;
means for dividing the input signal into a plurality of time frames;
means for extracting a plurality of spectral parameters for each time frame, which spectral parameters are representative of the spectral content of the input signal during the time frame; and
means for processing the spectral parameters for each time frame to compensate for the effects of said noise components on said speech components;
wherein said processing means is operable to subtract a set of average spectral parameters representative of an average frame of said input signal comprising speech components and noise components, from the spectral parameters within each frame in dependence upon a measure of the signal to noise ratio of said speech components and said noise components.

23. An apparatus according to claim 22, wherein said processing means is operable to subtract said average spectral parameters from the spectral parameters of the time frame when said signal to noise ratio is high and wherein said processing means is operable not to subtract said average spectral parameters when said signal to noise ratio measure is below a predetermined threshold.

24. An apparatus according to claim 22, wherein said speech processing apparatus is operable to process said input signal in real time, and wherein said average spectral parameters are determined from previously received frames of said input signal.

25. An apparatus according to claim 24, wherein said average spectral parameters are biased towards zero at the beginning of the input signal.

26. An apparatus according to claim 22, wherein said speech processing apparatus is operable to process said input signal in real time, and wherein said average spectral parameters are determined using a weighted average of previously received frames of the input signal, and wherein the weighting applied to each frame is dependent upon an SNR measure for the frame.

27. A speech processing method comprising:
receiving an input signal comprising speech components and noise components;
calculating a measure of the signal to noise ratio (SNR) for the input signal; and
scaling the input signal in dependence upon the calculated measure of the signal to noise ratio and in dependence upon a target SNR which is defined with reference to a target noise level.

28. A method according to claim 27, wherein said scaling step applies no scaling when the SNR measure is high and performs the scaling when the SNR is low.

29. A method according to claim 27, wherein said scaling step applies a scaling which varies exponentially with the measure of the SNR.

30. A method according to claim 27, further comprising the steps of dividing the input signal into a plurality of time frames and generating signals representative of the input signal in each time frame, wherein said calculating step calculates said SNR measure for the signals in each time frame and wherein said scaling step scales the signals in each time frame in dependence upon the SNR calculated for the time frame.

31. A method according to claim 30, wherein said scaling step performs said scaling in dependence upon the target SNR and wherein said target noise level is determined as a predetermined level beneath the maximum measure of the frame energy within the input signal.

32. A method according to claim 31, wherein said calculating step calculates a measure of the signal to noise ratio for a current frame using the following equation:

$$SNR_k = ln\,[e_k^{sig}] - ln[e^{noise}]$$

where $e_k^{sig}$ is a measure of the signal strength during the current frame and $e^{noise}$ is a measure of the background noise obtained by sampling the input signal when there is no speech component.

33. A method according to claim 32, wherein the input signal within each time frame is sampled and wherein said calculating step is operable to calculate the measure of the signal strength within the current frame by averaging the magnitudes of the samples within the current frame.

34. A method according to claim 30, wherein said signals representative of the input signal in each time frame comprise a plurality of spectral parameters for the input signal in the frame.

35. A method according to claim 34, wherein said spectral parameters comprise cepstral coefficients.

36. A method according to claim 34, wherein said scaling step performs a scaling operation using the following equation:

$$\tilde{f}_k = \frac{[\alpha - g(SNR_k^{target})]}{[\alpha - g(SNR_k)]} \cdot f_k$$

where $f_k$ comprises the vector of spectral parameters, $\alpha$ is an empirically chosen constant, $g(SNR_k)$ is an exponential function of the signal to noise ratio measure calculated by said calculating step and $g(SNR_k^{target})$ is an exponential function of the target SNR.

37. A method according to claim 36, wherein $\alpha$ is equal to a half.

38. A method according to claim 36, wherein said exponential function $g(\ )$ has the following form:

$$g(SNR_k) = \begin{cases} \exp(-\beta \cdot SNR_k) & SNR_k > 0 \\ 1 & SNR_k \leq 0 \end{cases}$$

where $\beta$ is an empirically chosen constant.

39. A method according to claim 27, wherein said scaling step scales said input signal in a substantially real time manner.

40. A method according to claim 27, further comprising the step of performing a signal to noise ratio dependent subtraction to the input signal.

41. A method according to claim 40, further comprising the steps of dividing the input signal into a plurality of time frames and generating signals representative of the input signal in each time frame, wherein said calculating step calculates said SNR measure for the signals in each time frame, wherein said scaling step scales the signals in each time frame in dependence upon the SNR calculated for the time frame and wherein said subtraction step subtracts signals representative of background noise when the SNR measure for the time frame is below a predetermined value.

42. A method according to claim 41, wherein said subtraction step does not perform a subtraction when said SNR measure is high.

43. A method according to claim 40, wherein said subtraction step performs a subtraction which varies exponentially with the measure of the SNR.

44. A method according to claim 40, further comprising the steps of dividing the input signal into a plurality of time frames and generating signals representative of the input signal in each time frame, wherein said calculating step calculates said SNR measure for the signals in each time frame, wherein said scaling step scales the signals in each time frame in dependence upon the SNR calculated for the time frame and wherein said subtraction step subtracts signals representative of a mean frame within the input signal when the SNR measure for the time frame is high.

45. A method according to claim 44, wherein said subtraction step does not perform said subtraction of said signals representative of the mean frame when said SNR measure is below a predetermined threshold.

46. A method according to claim 44, wherein said subtraction step is operable to perform said subtraction in a real time manner, and wherein said signals representative of the mean frame are estimated from previously received frames having a signal to noise ratio greater than a predetermined threshold.

47. A method according to claim 46, wherein the estimated signals are biased towards zero for the first few frames of the input signal.

48. A speech processing method comprising the steps of:
receiving an input signal comprising speech components and noise components;
dividing the input signal into a plurality of time frames;
extracting a plurality of spectral parameters for each time frame, which spectral parameters are representative of the spectral content of the input signal during the time frame; and
processing the spectral parameters for each time frame to compensate for the effects of said noise components on said speech components;
wherein said processing step subtracts a set of average spectral parameters representative of an average frame of said input signal comprising speech components and noise components, from the spectral parameters within each frame in dependence upon a measure of the signal to noise ratio of said speech components and said noise components.

49. A method according to claim 48, wherein said processing step subtracts said average spectral parameters from the spectral parameters of the time frame when said signal to noise ratio is high and does not subtract said average spectral parameters when said signal to noise ratio measure is below a predetermined threshold.

50. A method according to claim 48, wherein said speech processing method operates substantially in real time, and wherein said average spectral parameters are determined from previously received frames of the input signal for which the signal to noise ratio is above a predetermined value.

51. A method according to claim 50, wherein said average spectral parameters are biased towards zero at the beginning of the input signal.

52. A method according to claim 48, wherein said speech processing method operates substantially in real time, wherein said average spectral parameters are determined using a weighted average of previously received frames of the input signal, and wherein the weighting applied to each frame is dependent upon an SNR measure for the frame.

53. A computer readable medium storing computer executable process steps for processing a speech signal, the process steps comprising:
steps for receiving an input signal comprising speech components and noise components;
steps for calculating a measure of the signal to noise ratio (SNR) for the input signal; and
steps for scaling the input signal in dependence upon the calculated measure of the signal to noise ratio and in dependence upon a target SNR which is defined with reference to a target noise level.

54. A computer readable medium according to claim 53, wherein said scaling steps apply no scaling when the SNR measure is high and performs the scaling when the SNR is low.

55. A computer readable medium according to claim 53, wherein said scaling steps apply a scaling which varies exponentially with the measure of the SNR.

56. A computer readable medium according to claim 53, further comprising steps for dividing the input signal into a plurality of time frames and generating signals representative of the input signal in each time frame, wherein said calculating steps calculate said SNR measure for the signals in each time frame and wherein said scaling steps scale the signals in each time frame in dependence upon the SNR calculated for the time frame.

57. A computer readable medium according to claim 56, wherein said scaling steps perform said scaling in dependence upon the target SNR and wherein said target noise level is determined as a predetermined level beneath the maximum measure of the frame energy within the input signal.

58. A computer readable medium according to claim 57, wherein said calculating steps calculate a measure of the signal to noise ratio for a current frame using the following equation:

$$SNR_k = ln\,[e_k^{sig}] - ln\,[e^{noise}]$$

where $e_k^{sig}$ is a measure of the signal strength during the current frame and $e^{noise}$ is a measure of the background noise obtained by sampling the input signal when there is no speech component.

59. A computer readable medium according to claim 58, wherein the input signal within each time frame is sampled and wherein said calculating steps calculate the measure of the signal strength within the current frame by averaging the magnitudes of the samples within the current frame.

60. A computer readable medium according to claim 56, wherein said signals representative of the input signal in each time frame comprise a plurality of spectral parameters for the input signal in the frame.

61. A computer readable medium according to claim 60, wherein said spectral parameters comprise cepstral coefficients.

62. A computer readable medium according to claim 60, wherein said scaling steps perform a scaling operation using the following equation:

$$\tilde{f}_k = \frac{[\alpha - g(SNR_k^{target})]}{[\alpha - g(SNR_k)]} \cdot f_k$$

where $f_k$ comprises the vector of spectral parameters, $\alpha$ is an empirically chosen constant, $g(SNR_k)$ is an exponential function of the signal to noise ratio measure calculated by said calculating step and $g(SNR_k^{target})$ is an exponential function of the target SNR.

63. A computer readable medium according to claim 62, wherein $\alpha$ is equal to a half.

64. A computer readable medium according to claim 62, wherein said exponential function $g(\,)$ has the following form:

$$g(SNR_k) = \begin{cases} \exp(-\beta \cdot SNR_k) & SNR_k > 0 \\ 1 & SNR_k \leq 0 \end{cases}$$

where $\beta$ is an empirically chosen constant.

65. A computer readable medium according to claim 53, wherein said scaling steps scale said input signal in a substantially real time manner.

66. A computer readable medium according to claim 53, further comprising steps for performing a signal to noise ratio dependent subtraction to the input signal.

67. A computer readable medium according to claim 66, further comprising steps for dividing the input signal into a plurality of time frames and generating signals representative of the input signal in each time frame, wherein said calculating steps calculate said SNR measure for the signals in each time frame, wherein said scaling steps scale the signals in each time frame in dependence upon the SNR calculated for the time frame and wherein said subtraction steps subtract signals representative of background noise when the SNR measure for the time frame is below a predetermined value.

68. A computer readable medium according to claim 67, wherein said subtraction steps do not perform a subtraction when said SNR measure is high.

69. A computer readable medium according to claim 66, wherein said subtraction steps perform a subtraction which varies exponentially with the measure of the SNR.

70. A computer readable medium according to claim 66, further comprising steps for dividing the input signal into a plurality of time frames and generating signals representative of the input signal in each time frame, wherein said calculating steps calculate said SNR measure for the signals in each time frame, wherein said scaling steps scale the signals in each time frame in dependence upon the SNR calculated for the time frame and wherein said subtraction steps subtract signals representative of a mean frame within the input signal when the SNR measure for the time frame is high.

71. A computer readable medium according to claim 70, wherein said subtraction steps do not perform said subtraction of said signals representative of the mean frame when said SNR measure is below a predetermined threshold.

72. A computer readable medium according to claim 70, wherein said subtraction steps perform said subtraction in a real time manner, and wherein said signals representative of the mean frame are estimated from previously received frames having a signal to noise ratio greater than a predetermined threshold.

73. A computer readable medium according to claim 72, wherein the estimated signals are biased towards zero for the first few frames of the input signal.

74. A computer readable medium storing computer executable process steps for processing a speech signal, the process steps comprising:

steps for receiving an input signal comprising speech components and noise components;

steps for dividing the input signal into a plurality of time frames;

steps for extracting a plurality of spectral parameters for each time frame, which spectral parameters are representative of the spectral content of the input signal during the time frame; and steps for processing the spectral parameters for each time frame to compensate for the effects of said noise components on said speech components;

wherein said steps for processing the spectral parameters subtract a set of average spectral parameters representative of an average frame of said input signal comprising speech components and noise components, from the spectral parameters within each frame in dependence upon a measure of the signal to noise ratio of said speech components and said noise components.

75. A computer readable medium according to claim 74, wherein said steps for processing the spectral parameters subtract said average spectral parameters from the spectral parameters of the time frame when said signal to noise ratio is high and do not subtract said average spectral parameters when said signal to noise ratio measure is below a predetermined threshold.

76. A computer readable medium according to claim 74, wherein said computer executable process steps are executable substantially in real time, and wherein said average spectral parameters are determined from previously received frames of the input signal for which the signal to noise ratio is above a predetermined value.

77. A computer readable medium according to claim 76, wherein said average spectral parameters are biased towards zero at the beginning of the input signal.

78. A computer readable medium according to claim 74, wherein said computer executable process steps are executable substantially in real time, wherein said average spectral parameters are determined using a weighted average of previously received frames of the input signal, and wherein the weighting applied to each frame is dependent upon an SNR measure for the frame.

79. Computer executable process steps for processing speech signals, the process steps comprising:
- steps for receiving an input signal comprising speech components and noise components;
- steps for calculating a measure of the signal to noise ratio (SNR) for the input signal; and
- steps for scaling the input signal in dependence upon the calculated measure of the signal to noise ratio and in dependence upon a target SNR which is defined with reference to a target noise level.

80. Computer executable process steps according to claim 79, wherein said scaling steps apply no scaling when the SNR measure is high and performs the scaling when the SNR is low.

81. Computer executable process steps according to claim 79, wherein said scaling steps apply a scaling which varies exponentially with the measure of the SNR.

82. Computer executable process steps according to claim 79, further comprising steps for dividing the input signal into a plurality of time frames and generating signals representative of the input signal in each time frame, wherein said calculating steps calculate said SNR measure for the signals in each time frame and wherein said scaling steps scale the signals in each time frame in dependence upon the SNR calculated for the time frame.

83. Computer executable process steps according to claim 82, wherein said scaling steps perform said scaling in dependence upon the target SNR and wherein said target noise level is determined as a predetermined level beneath the maximum measure of the frame energy within the input signal.

84. Computer executable process steps according to claim 83, wherein said calculating steps calculate a measure of the signal to noise ratio for a current frame using the following equation:

$$SNR_k = ln\ [e_k^{sig} - ln\ [e^{noise}]$$

where $e_k^{sig}$ is a measure of the signal strength during the current frame and $e^{noise}$ is a measure of the background noise obtained by sampling the input signal when there is no speech component.

85. Computer executable process steps according to claim 84, wherein the input signal within each time frame is sampled and wherein said calculating steps calculate the measure of the signal strength within the current frame by averaging the magnitudes of the samples within the current frame.

86. Computer executable process steps according to claim 82, wherein said signals representative of the input signal in each time frame comprise a plurality of spectral parameters for the input signal in the frame.

87. Computer executable process steps according to claim 86, wherein said spectral parameters comprise cepstral coefficients.

88. Computer executable process steps according to claim 86, wherein said scaling steps perform a scaling operation using the following equation:

$$\tilde{f}_k = \frac{[\alpha - g(SNR_k^{target})]}{[\alpha - g(SNR_k)]} \cdot f_k$$

where $f_k$ comprises the vector of spectral parameters, $\alpha$ is an empirically chosen constant, $g(SNR_k)$ is an exponential function of the signal to noise ratio measure calculated by said calculating steps and $g(SNR_k^{target})$ is an exponential function of the target SNR.

89. Computer executable process steps according to claim 88, wherein $\alpha$ is equal to a half.

90. Computer executable process steps according to claim 88, wherein said exponential function $g(\ )$ has the following form:

$$g(SNR_k) = \begin{cases} \exp(-\beta \cdot SNR_k) & SNR_k > 0 \\ 1 & SNR_k \leq 0 \end{cases}$$

where $\beta$ is an empirically chosen constant.

91. Computer executable process steps according to claim 79, wherein said scaling steps scale said input signal in a substantially real time manner.

92. Computer executable process steps according to claim 79, further comprising steps for performing a signal to noise ratio dependent subtraction to the input signal.

93. Computer executable process steps according to claim 92, further comprising steps for dividing the input signal into a plurality of time frames and generating signals representative of the input signal in each time frame, wherein said calculating steps calculate said SNR measure for the signals in each time frame, wherein said scaling steps scale the signals in each time frame in dependence upon the SNR calculated for the time frame and wherein said subtraction steps subtract signals representative of background noise when the SNR measure for the time frame is below a predetermined value.

94. Computer executable process steps according to claim 93, wherein said subtraction steps do not perform a subtraction when said SNR measure is high.

95. Computer executable process steps according to claim 92, wherein said subtraction steps perform a subtraction which varies exponentially with the measure of the SNR.

96. Computer executable process steps according to claim 92, further comprising steps for dividing the input signal into a plurality of time frames and generating signals representative of the input signal in each time frame, wherein said calculating steps calculate said SNR measure for the signals in each time frame, wherein said scaling steps scale the signals in each time frame in dependence upon the SNR calculated for the time frame and wherein said subtraction steps subtract signals representative of a mean frame within the input signal when the SNR measure for the time frame is high.

97. Computer executable process steps according to claim 96, wherein said subtraction steps do not perform said subtraction of said signals representative of the mean frame when said SNR measure is below a predetermined threshold.

98. Computer executable process steps according to claim 96, wherein said subtraction steps perform said subtraction in a real time manner, and wherein said signals representative of the mean frame are estimated from previously received frames having a signal to noise ratio greater than a predetermined threshold.

99. Computer executable process steps according to claim 98, wherein the estimated signals are biased towards zero for the first few frames of the input signal.

100. Computer executable process steps for processing speech signals, the process steps comprising:
   steps for receiving an input signal comprising speech components and noise components;
   steps for dividing the input signal into a plurality of time frames;
   steps for extracting a plurality of spectral parameters for each time frame, which spectral parameters are representative of the spectral content of the input signal during the time frame; and
   steps for processing the spectral parameters for each time frame to compensate for the effects of said noise components on said speech components;
   wherein said steps for processing the spectral parameters subtract a set of average spectral parameters representative of an average fame of the input signal comprising speech components and noise components, from the spectral parameters within each frame in dependence upon a measure of the signal to noise ratio of said speech components and said noise components.

101. Computer executable process steps according to claim 100, wherein said steps for processing the spectral parameters subtract said average spectral parameters from the spectral parameters of the time frame when said signal to noise ratio is high and does not subtract said average spectral parameters when said signal to noise ratio measure is below a predetermined threshold.

102. Computer executable process steps according to claim 100, wherein said computer executable process steps can be executed in substantially real time, and wherein said average spectral parameters are determined from previously received frames of the input signal for which the signal to noise ratio is above a predetermined value.

103. Computer executable process steps according to claim 102, wherein said average spectral parameters are biased towards zero at the beginning of the input signal.

104. Computer executable process steps according to claim 100, wherein said computer executable process steps can be executed substantially in real time, wherein said average spectral parameters are determined using a weighted average of previously received frames of the input signal, and wherein the weighting applied to each frame is dependent upon an SNR measure for the frame.

105. A speech processing apparatus comprising:
   a receiver operable to receive an input signal comprising speech components and noise components;
   a calculator operable to calculate a measure of the signal to noise ratio (SNR) for the input signal; and
   a scaler operable to scale the input signal in dependence upon the calculated measure of the signal to noise ratio and in dependence upon a target SNR which is defined with reference to a target noise level.

106. An apparatus according to claim 105, wherein said scaler is operable to apply a scaling or not to apply a scaling in dependence upon the SNR measure.

107. An apparatus according to claim 105, wherein said scaler is operable to apply a scaling which varies exponentially with the measure of the SNR.

108. An apparatus according to claim 105, further comprising a divider operable to divide the input signal into a plurality of time frames and to generate signals representative of the input signal in each time frame, wherein said calculator is operable to calculate said SNR measure for the signals in each time frame and wherein said scaler is operable to scale the signals in each time frame in dependence upon the SNR calculated for the time frame.

109. An apparatus according to claim 108, wherein said scaler is operable to perform said scaling in dependence upon the target SNR and wherein said target noise level is determined as a predetermined level beneath the maximum measure of the frame energy within the input signal.

110. An apparatus according to claim 109, wherein said calculator is operable to calculate a measure of the signal to noise ratio for a current frame using the following equation:

$$SNR_k = ln\,[e_k^{sig}] - ln\,[e^{noise}]$$

where $e_k^{sig}$ is a measure of the signal strength during the current frame and $e^{noise}$ is a measure of the background noise obtained by sampling the input signal when there is no speech component.

111. An apparatus according to claim 110, wherein the input signal wihtin each time frame is sampled and wherein said calculator is operable to calculate the measure of the signal strength within a current frame by summing the magnitudes of the samples within the current frame.

112. An apparatus according to claim 108, wherein said signals representative of the input signal in each time frame comprise a plurality of spectral values for the input signal in the frame.

113. An apparatus according to claim 112, wherein said spectral values comprise cepstral coefficients.

114. An apparatus according to claim 112, wherein said scaler is operable to perform a scaling operation using the following equation:

$$\tilde{f}_k = \frac{[\alpha - g(SNR_k^{target})]}{[\alpha - g(SNR_k)]} \cdot f_k$$

where $f_k$ comprises the vector of spectral values, $\alpha$ is an empirically chosen constant, $g(SNR_k)$ is an exponential function of the signal to noise ratio measure calculated by said calculator and $g(SNR_k^{target})$ is an exponential function of the target SNR.

115. An apparatus according to claim 114, wherein $\alpha$ is equal to two.

116. An apparatus according to claim 114, wherein said exponential function g( ) has the following form:

$$g(SNR_k) = \begin{cases} \exp(-\beta \cdot SNR_k) & SNR_k > 0 \\ 1 & SNR_k \leq 0 \end{cases}$$

where $\beta$ is an empirically chosen constant.

117. An apparatus according to claim 105, wherein said scaler is operable to scale said input signal in a substantially real time manner.

118. An apparatus according to claim 105, further comprising a subtractor operable to perform a signal to noise ratio dependent subtraction to the input signal.

119. An apparatus according to claim 118, further comprising a divider operable to divide the input signal into a plurality of time frames and to generate signals representative of the input signal in each time frame, wherein said calculator is operable to calculate said SNR measure for the signals in each time frame, wherein said scaler is operable to scale the signals in each time frame in dependence upon the SNR calculated for the time frame and wherein said subtractor is operable to subtract signals representative of background noise when the SNR measure for the time frame is below a predetermined value.

120. An apparatus according to claim 119, wherein said subtractor is operable not to perform said subtraction when said SNR measure is high.

121. An apparatus according to claim 118, wherein said subtractor is operable to perform a subtraction when varies exponentially with the measure of the SNR.

122. An apparatus according to claim 118, further comprising a divider operable to divide the input signal into a plurality of time frames and for generating signals representative of the input signal in each time frame, wherein said calculator is operable to calculate said SNR measure for the signals in each time frame, wherein said scaler is operable to scale the signals in each time frame in dependence upon the SNR calculated for the time frame and wherein said subtractor is operable to subtract signals representative of a mean frame within the input signal when the SNR measure for the time frame is high.

123. An apparatus according to claim 122, wherein said subtractor is operable not to perform said subtraction of said signals representative of the mean frame when said SNR measure is below a predetermined threshold.

124. An apparatus according to claim 122, wherein said subtractor is operable to perform said subtraction in a real time manner, and wherein said signals representative of the mean frame are estimated from previously received frames having a signal to noise ratio greater than a predetermined threshold.

125. An apparatus according to claim 124, wherein the estimated signals are biased towards zero for the first few frames of the input signal.

126. A speech processing apparatus comprising:
a receiver operable to receive an input signal comprising speech components and noise components;
a divider operable to divide the input signal into a plurality of time frames;
an extractor operable to extract a plurality of spectral values for each time frame, which spectral values are representative of the spectral content of the input signal during the time frame; and
a processor operable to process the spectral values for each time frame to compensate for the effects of said noise components on said speech components;
wherein said processor is operable to subtract a set of average spectral values representative of an average frame of said input signal comprising speech components and noise components, from the spectral values within each frame in dependence upon a measure of the signal to noise ratio of said speech components and said noise components.

127. An apparatus according to claim 126, wherein said processor is operable to subtract said average spectral values from the spectral values of the time frame when said signal to noise ratio is high and wherein said processor is operable not to subtract said average spectral values when said signal to noise ratio measure is below a predetermined threshold.

128. An apparatus according to claim 126, wherein said speech processing apparatus is operable to process said input signal in real time, and wherein said average spectral values are determined from previously received input frames of said input signal.

129. An apparatus according to claim 128, wherein said average spectral values are biased towards zero at the beginning of the input signal.

130. An apparatus according to claim 126, wherein said speech processing apparatus is operable to process said input signal in real time, wherein said average spectral values are determined using a weighted average of previously received frames of said input signal, and wherein the weighting applied to each frame is dependent upon an SNR measure for the frame.

131. A speech processing apparatus comprising:
a receiver operable to receive an input signal comprising speech components and noise components;
a divider operable to divide the input signal into a plurality of time frames and for generating signals representative of the input signal in each time fame;
a calculator operable to calculate a measure of the signal to noise ratio (SNR) for the signals representative of the input signal in each time frame;
a scaler operable to scale the signals representative of each time frame in dependence upon the SNR measure for the time frame; and
a subtractor operable to perform a signal to noise ratio dependent subtraction to the signals representative of each time frame by subtracting signals representative of background noise when the SNR measure for the time frame is below a predetermined value.

132. A speech processing apparatus comprising:
a receiver operable to receive an input signal comprising speech components and noise components;
a calculator operable to calculate a measure of the signal to noise ratio (SNR) for the input signal;
a scaler operable to scale the input signal in dependence upon the calculated measure of the signal to noise ratio; and
a subtractor operable to perform a subtraction on the input signal, which subtraction varies exponentially with the measure of the SNR.

133. A speech processing apparatus comprising:
a receiver operable to receive an input signal comprising speech components and noise components;
a divider operable to divide the input signal into a plurality of time frames and for generating signals representative of the input signal in each time frame;
a calculator operable to calculate a measure of the signal to noise ratio (SNR) for the signals representative of the input signal in each time frame;
a scaler operable to scale the signals representative of each time frame in dependence upon the SNR measure for the time frame; and
a subtractor operable to perform a signal to noise ratio dependent subtraction to the signals representative of each time frame, by subtracting signals representative of a mean frame of the input signal comprising speech components and noise components when the SNR measure for the time frame is high.

134. A speech processing method comprising:
receiving an input signal comprising speech components and noise components;
dividing the input signal into a plurality of time frames and generating signals representative of the input signal in each time frame;
calculating a measure of the signal to noise ratio (SNR) for the signals representative of the input signal in each time frame;
scaling the signals representative of each time frame in dependence upon the SNR measure for the time frame; and
performing a signal to noise ratio dependent subtraction to the signals representative of each time frame by subtracting signals representative of background noise when the SNR measure for the time frame is below a predetermined value.

135. A speech processing method comprising:
- receiving an input signal comprising speech components and noise components;
- calculating a measure of the signal to noise ratio (SNR) for the input signal;
- scaling the input signal in dependence upon the calculated measure of the signal to noise ratio; and
- performing a subtraction on the input signal, which subtraction varies exponentially with the measure of the SNR.

136. A speech processing method comprising:
- receiving an input signal comprising speech components and noise components;
- dividing the input signal into a plurality of time frames and generating signals representative of the input signal in each time frame;
- calculating a measure of the signal to noise ratio (SNR) for the signals representative of the input signal in each time frame;
- scaling the signals representative of each time frame in dependence upon the SNR measure for the time frame; and
- performing a signal to noise ratio dependent subtraction to the signals representative of each time frame by subtracting signals representative of a mean frame of the input signal comprising speech components and noise components, when the SNR measure for the time frame is high.

137. A computer readable medium storing computer executable process steps for processing a speech signal, the process steps comprising:
- steps for receiving an input signal comprising speech components and noise components;
- steps for dividing the input signal into a plurality of time frames and generating signals representative of the input signal in each time frame;
- steps for calculating a measure of the signal to noise ratio (SNR) for the signals representative of the input signal in each time frame;
- steps for scaling the signals representative of each time frame in dependence upon the SNR measure for the time frame; and
- steps for performing a signal to noise ratio dependent subtraction to the signals representative of each time frame by subtracting signals representative of background noise when the SNR measure for the time frame is below a predetermined value.

138. A computer readable medium storing computer executable process steps for processing a speech signal, the process steps comprising:
- steps for receiving an input signal comprising speech components and noise components;
- steps for calculating a measure of the signal to noise ratio (SNR) for the input signal;
- steps for scaling the input signal in dependence upon the calculated measure of the signal to noise ratio; and
- steps for performing a subtraction on the input signal, which subtraction varies exponentially with the measure of the SNR.

139. A computer readable medium storing computer executable process steps for processing a speech signal, the process steps comprising:
- steps for receiving an input signal comprising speech components and noise components;
- steps for dividing the input signal into a plurality of time frames and generating signals representative of the input signal in each time fame;
- steps for calculating a measure of the signal to noise ratio (SNR) for the signals representative of the input signal in each time frame;
- steps for scaling the signals representative of each time frame in dependence upon the SNR measure for the time frame; and
- steps for performing a signal to noise ratio dependent subtraction to the signals representative of each time frame by subtracting signals representative of a mean frame of the input signal comprising speech components and noise components, when the SNR measure for the time frame is high.

140. Computer executable process steps for processing a speech signal, the process steps comprising:
- steps for receiving an input signal comprising speech components and noise components;
- steps for dividing the input signal into a plurality of time frames and generating signals representative of the input signal in each time frame;
- steps for calculating a measure of the signal to noise ratio (SNR) for the signals representative of the input signal in each time frame;
- steps for scaling the signals representative of each time frame in dependence upon the SNR measure for the time frame; and
- steps for performing a signal to noise ratio dependent subtraction to the signals representative of each time frame by subtracting signals representative of background noise when the SNR measure for the time frame is below a predetermined value.

141. Computer executable process steps for processing a speech signal, the process steps comprising:
- steps for receiving an input signal comprising speech components and noise components;
- steps for calculating a measure of the signal to noise ratio (SNR) for the input signal;
- steps for scaling the input signal in dependence upon the calculated measure of the signal to noise ratio; and
- steps for performing a subtraction on the input signal, which subtraction varies exponentially with the measure of the SNR.

142. Computer executable process steps for processing a speech signal, the process steps comprising:
- steps for receiving an input signal comprising speech components and noise components;
- steps for dividing the input signal into a plurality of time frames and for generating signals representative of the input signal in each time frame;
- steps for calculating a measure of the signal to noise ratio (SNR) for the signals representative of the input signal in each time frame;
- steps for scaling the signals representative of each time frame in dependence upon the SNR measure for the time frame; and
- steps for performing a signal to noise ratio dependent subtraction to the signals representative of each time frame by subtracting signals representative of a mean frame of the input signal comprising speech components and noise components, when the SNR measure for the time frame is high.

* * * * *

UNITED STATES PATENT AND TRADEMARK OFFICE
CERTIFICATE OF CORRECTION

PATENT NO. : 6,965,860 B1
APPLICATION NO. : 09/551909
DATED : November 15, 2005
INVENTOR(S) : David Llewellyn Rees et al.

It is certified that error appears in the above-identified patent and that said Letters Patent is hereby corrected as shown below:

ON THE TITLE PAGE
Item (75) Inventors, "Guilford (GB)" should read --Guildford (GB)-- (both occurrences).

COLUMN 1
Line 5, insert --Background of the Invention--.
Line 6, "ad" should read --and--.
Line 17, insert --Brief Summary of the Invention--.
Line 48, "one" should read --time--.
Line 61, insert --Brief Description of the Drawings--.
Line 63, "drawing" should read --drawings--.

COLUMN 2
Line 33, insert --Detailed Description of the Invention--.
Line 54, "programs" should read --programme--.
Line 56, "example" should read --example,--.

COLUMN 3
Line 35, "format" should read --"formant"--.
Line 38, "FIG. 3" should read --¶ FIG. 3--.
Line 39, "preprocessor is." should read --preprocessor 15.--.
Line 49, "same" should read --some--.
Line 51, "a" should read --an--.

COLUMN 4
Line 3, "(il)" should read --(ii)--.
Line 22, close up right margin.
Line 23, close up left margin.
Line 29, "frame" should read --frames--.
Line 30, "process" should read --processes--.

COLUMN 5
Line 27, "noise)," should read --noise).--.
Line 64, "$C_L$" should read --$C_i$--.

COLUMN 6
Line 2, "utterance." should read --utterances.--.
Line 58, " "which" should read --which--.

UNITED STATES PATENT AND TRADEMARK OFFICE
CERTIFICATE OF CORRECTION

PATENT NO.     : 6,965,860 B1
APPLICATION NO. : 09/551909
DATED          : November 15, 2005
INVENTOR(S)    : David Llewellyn Rees et al.

It is certified that error appears in the above-identified patent and that said Letters Patent is hereby corrected as shown below:

COLUMN 7
Line 3, "C'$_i$ in" should read --C'$_i$ varies in--.
Line 41, "investors" should read --inventors-- and "here" should read --where--.

COLUMN 8
Line 6, "embodiment" should read --embodiment,--.
Line 20, "A" should read --As--.
Line 30, "embodiment" should read --embodiment,--.
Line 48, "presence," should read --presence--.
Line 60 "$\sigma_i(SNR_k)$" should read --"$\sigma_i(SNR\infty)$--.
Line 64, "$\sigma_i(SNR)$" should read --"$\sigma_i(SNR\infty)$--.
Line 67, "$g(SND_k)$" should read --$g(SNR_k)$--.

COLUMN 9
Line 17, "($\sigma^T_1$" should read --"($\sigma^T_i$--.
Line 18, "$(SNR_k^{target})$" should read --$(SNR_k^{target}))$--.
Line 62, "=$\ln[e_k^{rig}]$" should read --=$\ln[e_k^{sig}]$--.
Line 66, "constant amount (Y)" should read --constant amount (ϒ)--.

Line 67, "constant (Y)" should read --constant (ϒ)--.

COLUMN 10
Line 1, "Y" should read -- ϒ --.

Line 4, "Y" should read -- ϒ --.

Line 21, "energy (ē)" should read --energy (ê).--.

Line 24, "an" should read --as--.
Line 25, "time $t_1$," should read --time $t_2$,--.
Line 49, "unit 71" should read --unit 77--.

COLUMN 11
Line 4, "scaling unit 33." should read --scaling unit 83.--.

Line 53, "y" should read -- ϒ --.

COLUMN 12
Line 42, "these" should read --there--.

UNITED STATES PATENT AND TRADEMARK OFFICE
CERTIFICATE OF CORRECTION

PATENT NO. : 6,965,860 B1
APPLICATION NO. : 09/551909
DATED : November 15, 2005
INVENTOR(S) : David Llewellyn Rees et al.

It is certified that error appears in the above-identified patent and that said Letters Patent is hereby corrected as shown below:

COLUMN 16
Line 63, "performs" should read --perform--.

COLUMN 19
Line 28, "performs" should read --perform--.
Line 52, "$SNR_k=\ln [e_k^{sig}9 -\ln [e^{noise}]$" should read --$SNR_k=1n [e_k^{sig}]-\ln [e^{noise}]$--.

COLUMN 21
Line 31, "does" should read --do--.

COLUMN 22
Line 19, "wihtin" should read --within--.
Line 55, "subtractor" should read --subtracter--.
Line 65, "subtractor" should read --subtracter--.

COLUMN 23
Line 2, "subtractor" should read --subtracter--.
Line 5, "subtractor" should read --subtracter--.
Line 13, "subtractor" should read --subtracter--.
Line 17, "subtractor" should read --subtracter--.
Line 21, "subtractor" should read --subtracter--.

UNITED STATES PATENT AND TRADEMARK OFFICE
CERTIFICATE OF CORRECTION

PATENT NO. : 6,965,860 B1
APPLICATION NO. : 09/551909
DATED : November 15, 2005
INVENTOR(S) : David Llewellyn Rees et al.

It is certified that error appears in the above-identified patent and that said Letters Patent is hereby corrected as shown below:

COLUMN 24
Line 14, "subtractor" should read --subtracter--.
Line 28, "subtractor" should read --subtracter--.
Line 44, "subtractor" should read --subtracter--.

Signed and Sealed this

Twenty-first Day of November, 2006

JON W. DUDAS
*Director of the United States Patent and Trademark Office*